March 29, 1960 J. G. VAN SANTEN ET AL 2,930,999

PHOTO-CONDUCTIVE DEVICE AND METHOD OF MANUFACTURING THE SAME

Filed Aug. 19, 1957

INVENTOR
JOHANNES GERRIT VAN SANTEN
HENDRIK JACOBUS MARIA JOORMANN

BY

Frank R. Jufani

AGENT

United States Patent Office 2,930,999

Patented Mar. 29, 1960

2,930,999

PHOTO-CONDUCTIVE DEVICE AND METHOD OF MANUFACTURING THE SAME

Johannes Gerrit van Santen and Hendrik Jacobus Maria Joormann, both of Eindhoven, Netherlands, assignors to North American Philips Company, Inc., New York, N.Y., a corporation of Delaware Application August 19, 1957, Serial No. 678,946

Claims priority, application Netherlands September 29, 1956

14 Claims. (Cl. 338—15)

The invention relates to a photo-conductive device, which comprises a coherent, homogeneous, photo-conductive body, for example, in the form of a layer. The invention furthermore relates to a method of manufacturing such a device.

A known phenomenon occuring with many substances, particularly with semi-conductors, is that their electrical admittance increases under the action of electromagnetic or corpuscular radiation. This phenomenon, which is known under the name of photo-conduction, does not occur, however, with all these substances to an extent such that they are suitable for use in those photo-conductive devices in which a high sensitivity is required, for example, in a solid-state image intensifier. Where reference is made herein to a photo-conductive body or a photo-conductive substance or material, this is to be understood to mean a body or a substance whose specific radiation sensitivity is at least equal to $$\frac{10^{-4}\Omega^{-1}\text{cm.}^2}{\text{watt}}$$

The term "specific radiation sensitivity" is to be understood to mean the increase in electrical admittance upon irradiation with a unit of irradiation intensity. In other words, it means an increase in specific admittance (specific conductivity) of at least $10^{-4}\Omega^{-1}\text{cm.}^{-1}$ per irradiation intensity in watts per unit volume in cm.$^3$, the unit volume being considered being the effective volume in which photo-carriers are produced. The measurement is made with a wavelength of radiation at which the material exhibits substantially its maximum sensitivity. A satisfactory photo-conductive body has, apart from a high radiation sensitivity, a low dark conduction, which is to be understood to mean a low electrical conductivity in the absence of radiation. In the solid-state image intensifier, for example, use is made of photo-conductive bodies of which the dark conduction is lower than $10^{-6}\Omega^{-1}\text{cm.}^{-1}$. Photo-conductive bodies which are obtained by compressing and sintering photo-conductive grains cannot form such a coherent unit that they can be employed for all uses. They are, for example, not satisfactorily suitable for use in the solid-state image intensifier, in which a satisfactorily coherent photo-conductive layer with a large receiving surface is used. There are known, it is true, satisfactorily coherent photo-conductive layers of which the photo-conductive grains are embedded in an insulating binder, particularly an organic binder, for example, ethyl cellulose or an epoxy resin known under the trade-name of "Araldite," but these photo-conductive layers with an organic binder have the disadvantage that the photo-conductive properties thereof vary with time owing to the after-effect of this binder. Moreover, the radiation sensitivity of these layers is not very high.

The invention has for its object to provide a photo-conductive device comprising a coherent, homogeneous, photo-conductive body which is not subject to variation extremely high radiation sensitivity and which can be manufactured in a simple manner in the form of a layer with a comparatively large surface.

The photo-conductive device according to the invention comprises a photo-conductive body consisting of a coherent, homogeneous mixture of photo-conductive substance and glass enamel. Glass enamels, which are sometimes referred to as glazes, are glasses having a low melting temperature and a short softening range. The glass enamel constitutes the sintering medium. The mixture may also contain, in addition, a small content of other substances, for example, activators. The photo-conductive body is preferably shaped in the form of a layer applied to a support for example, of glass or metal.

It has been surprisingly found that such a photo-conductive body, even with a small content of glass enamel, can be manufactured in the form of a satisfactorily coherent, homogeneous layer with a large surface, this layer having a radiation sensitivity many times that of a photo-conductive layer with an organic binder, if the layer consists of 60 to 90 vol. percent of photo-conductive substance and otherwise glass enamel. The radiation sensitivity of a photo-conductive layer consisting of about 80 vol. percent of cadmium sulphide and 20 vol. percent of lead-free glass enamel may, for example, be about 10 times for direct current, and even 30 times, for alternating current than that of a similar photo-conductive layer with an organic binder. The photo-conductive device according to the invention does not exhibit any variation with time due to an after-effect of the binder.

A particularly suitable, simple method according to the invention for the manufacture of a photo-conductive device as described above consists in that a finely divided, homogeneous mixture containing photo-conductive grains and glass enamel grains preferably in the ratio referred to above is heated in an oxygen-containing atmosphere, for example, in air, to at least the melting temperature of the glass enamel. As a matter of fact, only those photo-conductive substances can be used whose melting temperature is higher than that of the glass enamel. The finely divided mixture is applied, preferably prior to sintering, to a support for example of metal or glass, so that, subsequent to sintering, it forms a solid, coherent layer therewith.

During the heating in an oxygen-containing atmosphere, preferably in air, the photo-conductive layer may be activated additionally by the effect of the oxygen. Since the glass enamel, upon melting, envelops the photo-conductive grains and thus screens them from the atmosphere, an excessively long action of the oxygen, which might have a harmful effect on the dark conduction and the radiation sensitivity, is avoided. Therefore, the sintering process need not take place in an inert atmosphere and the activation with oxygen need not be carried out in a separate process.

The layers thus obtained are found to be particularly porous with a low content of glass enamel, for example, 20 vol. percent. The porosity may be obviated by covering the layer with a lacquer, for example, an epoxy resin, known under the trade name of "Araldite." This treatment does not affect the photo-conductive properties of the layer. The photo-conductive properties of such a layer, the pores of which are filled with an insulating lacquer, remain constant with time.

Use is preferably made of a glass enamel free from lead, since lead reacts chemically with most photo-conductive substances during the sintering process, which reaction reduces the radiation sensitivity and increases the dark conduction.

The invention will now be described more fully with reference to a few embodiments which are illustrated Fig. 1 is a graph of the relationship between the composition and the radiation sensitivity of a photo-conductive device according to the invention;

Figures 1, 2:
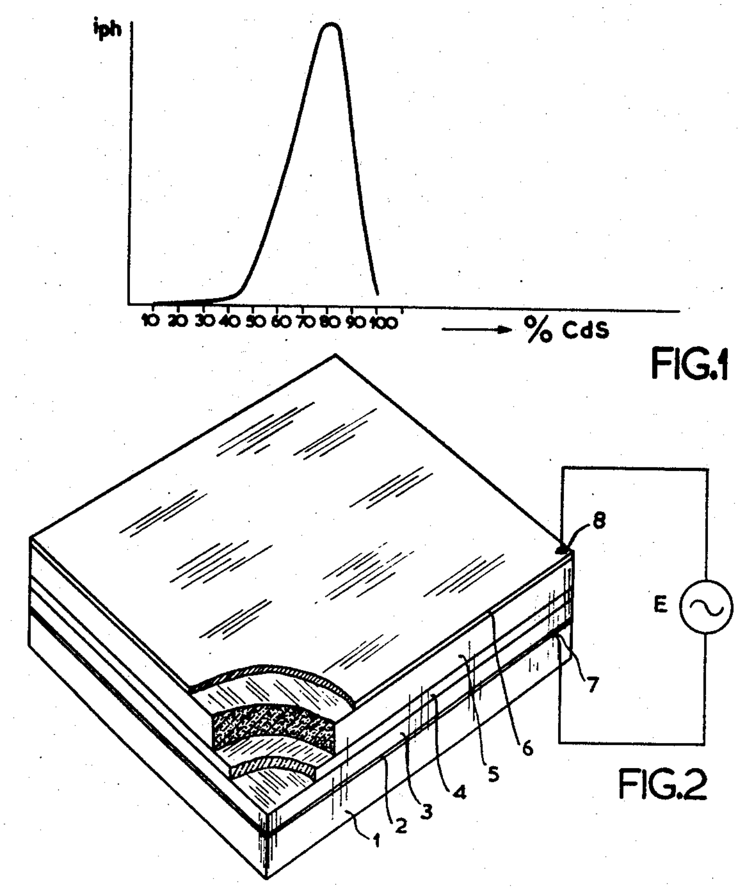
Fig. 2 is a perspective view of a solid-state image intensifier, in which a photo-conductive device according to the invention is employed.

Fig. 1 shows graphically the relationship between the composition of a photo-conductive layer consisting of a mixture of cadmium sulphide and a glass enamel free from lead, which is rapidly heated to the melting temperature of the enamel, and the photo-current $i_{ph}$, which is a measure for the radiation sensitivity of the layer with a constant radiation intensity. On the abscissa is plotted the volume percentage of cadmium sulphide contained in the photo-conductive layer and on the ordinate is plotted the relative photo-current $i_{ph}$ on a linear scale.

From th's graph it is evident that a conspicuous maximum of the photo-current occurs in the range of compcsitions corresponding to a content of 75 to 85 vol. percent of cadmium sulphide, i.e. with a composition of 80 vol. percent of cadmium sulphide and 20 vol. percent of lead-free glass enamel. It will furthermore be appreciated that the radiation sensitivity is particularly high for all those compositions which correspond to a content of 60 to 90 vol. percent of cadmium sulphide. With a content of 100 vol. percent of cadmium sulphide the radiation sensitivity is extremely low, since in this case the photo-conductive layer consists of an incoherent quantity of photo-conductive grains. In the range of compositions corresponding to a content of 0 to 50 vol. percent of cadmium sulphide the radiation sensitivity is low, since owing to the presence of an excess quantity of glass enamel a poor electrical contact prevails between the photo-conductive grains. A corresponding relationship between radiation sensitivity and composition is also found with other photo-conductive substances, for example for cadmium selenide.

Fig. 2 shows diagrammatically in a perspective view a sol'd-state image intensifier, in which a photo-conductive body according to the invention is employed. For the sake of clarity the device is shown partly in a sectional view.

To a glass substratum 1 of a few millimetres in thickness made of a common glass is applied by vaporization a very thin, transparent conductive tin-oxide layer 2 of 0.1 $\mu$ in thickness. The dimensions of the layer are 30 x 30 cm.$^2$. To the layer 2 is applied an electro-luminescent layer 3, consisting of 20 vol. percent of ZnS and 80 percent of lead-free glass enamel. An example of a common glass and a lead-free glass enamel will be given hereinafter with the description of the manufacture of a photo-conductive layer. The thickness of the electro-luminescent layer 3 is 30 $\mu$. The electro-luminescent layer 3 is separated by a thin intermediate layer 4 of black glass of a few microns in thickness from the photo-conductive layer 5, which consists of a coherent, homogeneous mixture of 80 vol. percent of cadmium sulphide and 20 vol. percent of lead-free glass enamel. The manufacture of this photo-conductive layer, which has a thickness of 500 $\mu$, will be described separately hereinafter. The pores of the photo-conductive layer 5 are filled with an epoxy resin, which is known under the trade name of "Araldite." On the photo-conductive layer 5 provision is made of a conductive, aluminum layer 6, which is pervious to radiation and which has a thickness of 0.5 $\mu$. The whole structure is surrounded by a protective lacquer layer of "Araldite." Supply electrodes 7 and 8 are connected to the conductive layers 2 and 6 respectively. Between these electrodes 7 and 8 is connected a source E of alternating voltage.

The image to be amplified is projected onto that side of the device where the photo-conductive layer is provided, in this case on the top side. The image penetrates through the transparent aluminum layer 6 into the photo-conductive layer 5, so that in this layer a conductivity is produced which varies with the locally prevailing radiation intensity. This conductivity pattern is transferred by the voltage supply E in the form of an analogous field-intensity pattern to the electro-luminescent layer 3, which is excited accordingly and which reproduces the initial image in amplified form. The amplified image is visible through the thin, transparent layer 2 on the bottom side where the electroluminescent layer is provided.

Figure 3:
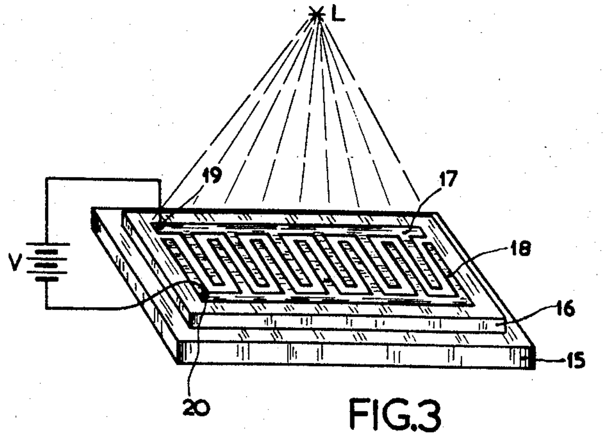
Fig. 3 is a perspective view of a photo-cell according to the invention.

Fig. 3 shows diagrammatically in a perspective view a photo-cell according to the invention.

To a support 15 of an arbitrary common glass is applied a photo-conductive layer 16 of a homogeneous, sintered mixture of 80 vol. percent of cadmium sulphide and 20 vol. percent of lead-free glass enamel. The manufacture of such a layer will be described separately hereinafter. To this layer 2 are applied by vaporization in the form of an interdigital line pattern, two aluminum electrodes 17 and 18, to which are secured the supply electrodes 19 and 20 respectively. Between these supply electrodes is connected a voltage source V. Radiation from a source of radiation L, arranged on that side of the device where the electrodes 17 and 18 are provided, is caused to fall on the photo-conductive layer 16, sc that the electrical current passing through the layer is varied in accordance with the radiation intensity. This photo-conductive device may be use, for example, ir conjunction with a relay as an extremely sensitive switcl or in conjunction with a current indicator as a measurin instrument.

A photo-conductive layer as described above was manu factured in the following manner:

The photo-conductive substance was cadmium sulphide which was activated with $2\times10^{-4}$ gram-atoms coppe and $1.9\times10^{-4}$ gram-atoms gallium per gram molecul CdS. In connection with their high radiation sensitivit the chalcogenides, particularly the chalcogenides o cadmium, are extremely suitable. The chalcogenides o cadmium are to be understood to mean herein the com pounds of cadmium with sulphur, selenium, and/or te lurium, but not with polonium, which is sometimes cor sidered as a chalcogenide. Various other chalcogenide may however, advantageously be used, such as for ir stance ZnTe, PbTe, mixed crystals, for instance zin cadmium telluride. In general any photo-sensitive m terial may be employed, for instance silicon.

By sieving a cadmium sulphide powder was obtaine of which the granular size was smaller than 40$\mu$.

Use was made of a lead-free glass enamel with fluorine content of 2.4% by weight, of which the ana ysis, expressed as oxides, was as follows: $SiO_2$ 14.9 by weight, $B_2O_3$ 26.2% by weight, $Na_2O$ 7.0% by weigh $K_2O$ 7.0% by weight, CaO 3.6% by weight, SrO 6.5 by weight, ZnO 25.5% by weight, $Al_2O_3$ 3.3% by weigh $TiO_2$ 3.0% by weight and $Sb_2O_3$ 3.0% by weight. T melting temperature of the enamel was 600° C. U is preferably made of an enamel having a melting te perature as low as possible, for example lower th 800° C., in order to avoid attack, decomposition evaporation of the photo-conductive substance. For se eral days the enamel was ground to fineness in a b mill until the granular size was smaller than 4$\mu$. T granular size of the photo-conductive substance and the enamel is chosen preferably to be as small as p sible, in order to obtain a homogeneous layer. Mo over, the granular size of the enamel is chosen to preferably a factor four smaller than that of the pho conductive substance, in order to obtain subsequen after the mixing of the two substances, a mixture which the photo-conductive grains are embedded in fine enamel powder, which envelops the grains.

The powders were then suspended separately in organic liquid: 384 gs. of cadmium sulphide pow was suspended in a liquid mixture of 20 gs. of butyl acetate and 20 gs. of butyl lactate, and 65 gs. of enamel powder was added to a liquid of 20 gs. of butanol and 10 gs. of glucol, Then the two liquids were mixed. For 20 minutes the mixture was stirred vigorously, until all the air had escaped from the liquid.

Then the mixture was sprayed onto a support of a common glass, of which the analysis, expressed as oxides, was as follows: $SiO_3$ 70% by weight, $Na_2O$ 16.9% by weight, $K_2O$ 1.0% by weight, CaO 5.4% by weight, BaO 2.0% by weight, $Al_2O_3$ 0.5% by weight, MgO 3.9% by weight and $Sb_2O_3$ 0.3% by weight. The expansion coefficient of this common glass was approximately equal to that of the enamel. Since the photo-conductive layer, owing to the high enamel content, is porous and porous layers are readily deformable, the expansion coefficients of the support and the layer need not be adapted accurately to one another.

The thickness of the applied layer was about $200\mu$. The assembly was then rapidly heated in air to 600° C. and cooled practically immediately thereafter. According as the melting temperature of the enamel is higher, the heating to the melting temperature must be carried out more rapidly. If the heating to the melting temperature were carried out slowly, there would be the risk that the photo-conductive grains are exposed too long to the action of the oxygen before the entire envelope of the photo-conductive grains and the attendant screening from the atmosphere by the liquid enamel are completed.

By means of a suitable mask an interdigital line pattern of aluminum was then applied by vaporization, the electrode distance being 0.5 mm. The supply electrodes were secured by means of a silver paste.

A measurement showed that the increase in conductivity with a radiation of white light and at a voltage difference of 300 v. was $$\frac{15 \text{ mho}}{\text{watt}}$$

which corresponds to a specific radiation sensitivity of about $0.04\Omega^{-1}$ cm.$^2$/watt.

It should finally be noted that the invention is not restricted to the embodiments of photo-conductive devices as described above, but that it also extends to those photo-conductive devices in which a photo-conductive body of the aforesaid composition is employed.

What is claimed is:

1. A coherent, photo-conductive body comprising a homogeneous mixture of a photo-conductive material and a glass enamel, and an electrical connection to said body.

2. A coherent, photo-conductive body comprising a sintered homogeneous mixture of a photo-conductive material and a glass enamel in which the former constitutes between 60% and 90% by volume of the mixture.

3. A photo-conductive body as set forth in claim 2 wherein the photo-conductive material comprises a cadmium chalcogenide.

4. A photo-conductive device comprising a photo-conductive body constituted of a sintered homogeneous mixture of a pulverulent photo-conductive material and a pulverulent glass enamel in which the former constitutes between 60% and 90% by volume of the mixture, and means for effecting plural electrical connections to spaced portions of the body.

5. A device as set forth in claim 4 wherein a support is provided, and the photo-conductive body comprises a coherent layer on said support.

6. A device as set forth in claim 5 wherein the body contains surface pores, and an insulating material fills said surface pores.

7. A photo-conductive device comprising a photo-conductive body constituted of a sintered homogeneous mixture of a pulverulent photo-conductive material and a pulverulent lead-free glass enamel in which the former constitutes between 60% and 90% by volume of the mixture, and means for effecting plural electrical connections to spaced portions of the body.

8. A device as set forth in claim 7 wherein the photo-conductive material is a chalcogenide.

9. A photo-conductive device comprising a photo-conductive body constituted of a sintered homogeneous mixture of pulverulent photo-conductive cadmium sulphide and a pulverulent lead-free glass enamel in which the former constitutes between 75% and 85% by volume of the mixture, and means for effecting plural electrical connections to spaced portions of the body.

10. A device as set forth in claim 9 wherein the photo-conductive cadmium sulphide is activated with about $2\times10^{-4}$ gram-atoms of copper and about $2\times10^{-4}$ gram-atoms of gallium per gram-molecule of cadmium sulphide.

11. A method of manufacturing a photo-conductive body comprising providing a finely-divided homogeneous mixture of photo-conductive particles and glass enamel particles wherein the former constitutes between 60% and 90% by volume of the mixture, and heating the mixture in an oxygen-containing atmosphere to a temperature at which the glass enamel melts uniting the photo-conductive particles together to form a coherent body.

12. A method as set forth in claim 11, wherein the particle size of the photo-conductive particles is below 40 microns.

13. A method as set forth in claim 11 wherein the melting temperature of the glass enamel is below 800° C.

14. A method as set forth in claim 12 wherein the particle size of the glass enamel particles is smaller than, by at least a factor of 4, that of the photo-conductive particles.

References Cited in the file of this patent

UNITED STATES PATENTS

| | | |
|---|---|---|
| 2,573,200 | Hushley | Oct. 30, 1951 |
| 2,651,700 | Gans | Sept. 8, 1953 |
| 2,689,188 | Hushley | Sept. 14, 1954 |
| 2,768,310 | Kazan et al. | Oct. 23, 1956 |

OTHER REFERENCES

Bube: "Photoconductivity of the Sulfide, Selenide, and Telluride of Zinc or Cadmium," "Proceedings of the I.R.E.," December 1955, pages 1836–1849, page 1837 relied upon.

Roberts: "Field Strength and Temperature Studies of Electro Luminescent Powders in Dielectric Media," "Journal of the Optical Society of America," vol. 42, No. 11, November 1952, pages 850–854 relied upon.

UNITED STATES PATENT OFFICE

CERTIFICATE OF CORRECTION

Patent No. 2,930,999 March 29, 1960

Johannes Gerrit van Santen et al.

It is hereby certified that error appears in the printed specification of the above numbered patent requiring correction and that the said Letters Patent should read as corrected below.

Column 4, line 29, for "use" read -- used --; column 5, line 3, for "liquid of" read -- liquid mixture of --.

Signed and sealed this 13th day of September 1960.

(SEAL)

Attest:

KARL H. AXLINE

Attesting Officer

ROBERT C. WATSON

Commissioner of Patents

Notice of Adverse Decision in Interference

In Interference No. 93,831 involving Patent No. 2,930,999, J. G. van Santen and H. J. M. Joormann, PHOTO-CONDUCTIVE DEVICE AND METHOD OF MANUFACTURING THE SAME, final judgment adverse to the patentees was rendered June 3, 1964, as to claim 1.

[*Official Gazette May 18, 1965.*]